(12) United States Patent
Kay et al.

(10) Patent No.: US 7,205,337 B2
(45) Date of Patent: Apr. 17, 2007

(54) END-CAPPED POLYMERS AND COMPOSITIONS CONTAINING SUCH COMPOUNDS

(75) Inventors: John F. Kay, Encinitas, CA (US); John J. Eisch, Vestal, NY (US)

(73) Assignee: IsoTis OrthoBiologics, Inc., Irvine, CA (US)

( * ) Notice: Subject to any disclaimer, the term of this patent is extended or adjusted under 35 U.S.C. 154(b) by 219 days.

(21) Appl. No.: 10/600,130

(22) Filed: Jun. 19, 2003

(65) Prior Publication Data

US 2004/0076677 A1    Apr. 22, 2004

Related U.S. Application Data

(63) Continuation-in-part of application No. 10/326,339, filed on Dec. 20, 2002.

(60) Provisional application No. 60/345,113, filed on Dec. 21, 2001.

(51) Int. Cl.
*A61K 47/00* (2006.01)

(52) U.S. Cl. .............. 514/772.1; 424/400; 424/484; 424/486; 424/489; 424/500; 424/501; 514/772

(58) Field of Classification Search ............ None
See application file for complete search history.

(56) References Cited

U.S. PATENT DOCUMENTS

| | | | |
|---|---|---|---|
| 2,520,611 A | 8/1950 | Roberts et al. | 568/613 |
| 2,520,612 A | 8/1950 | Roberts et al. | 568/613 |
| 2,674,619 A | 4/1954 | Lundsted | 560/198 |
| 3,393,179 A | 7/1968 | Leverett | 525/398 |
| 3,393,242 A | 7/1968 | Seale et al. | 568/607 |
| 3,393,243 A | 7/1968 | Cuscurida | 568/620 |
| 3,653,183 A | 4/1972 | Sanders et al. | 95/163 |
| 3,833,725 A | 9/1974 | Thompson | 514/180 |
| 4,011,313 A | 3/1977 | Thompson | 514/153 |
| 4,301,083 A | 11/1981 | Yoshimura et al. | 554/64 |
| 4,330,677 A | 5/1982 | Linke et al. | 562/583 |
| 4,394,370 A | 7/1983 | Jefferies | 606/76 |
| 4,472,840 A | 9/1984 | Jefferies | 128/898 |
| 4,587,365 A | 5/1986 | Anchor | 568/619 |
| 4,595,713 A | 6/1986 | St. John | 523/105 |
| 4,764,567 A | 8/1988 | Ott | 525/403 |
| 4,902,834 A | 2/1990 | Otten et al. | 568/608 |
| 4,922,029 A | 5/1990 | Birnbach et al. | 568/616 |
| 4,975,526 A | 12/1990 | Kuberasampath et al. | 530/350 |
| 4,994,626 A | 2/1991 | Greenough et al. | 568/618 |
| 5,073,373 A | 12/1991 | O'Leary et al. | 424/422 |
| 5,108,753 A | 4/1992 | Kuberasampath et al. | 424/422 |
| 5,130,413 A | 7/1992 | Asai et al. | 528/408 |
| 5,171,574 A | 12/1992 | Kuberasampath et al. | 424/423 |
| 5,284,655 A | 2/1994 | Bogdansky et al. | 424/422 |
| 5,290,552 A * | 3/1994 | Sierra et al. | 424/94.64 |
| 5,290,558 A | 3/1994 | O'Leary et al. | 424/422 |
| 5,292,516 A | 3/1994 | Viegas et al. | 424/423 |
| 5,306,304 A | 4/1994 | Gendler | 623/23.63 |
| 5,306,501 A | 4/1994 | Viegas et al. | 424/423 |
| 5,330,768 A | 7/1994 | Park et al. | 424/501 |
| 5,346,703 A | 9/1994 | Viegas et al. | 424/486 |
| 5,356,629 A | 10/1994 | Sander et al. | 424/422 |
| 5,464,439 A | 11/1995 | Gendler | 128/898 |
| 5,503,558 A | 4/1996 | Clokie | 433/173 |
| 5,516,532 A | 5/1996 | Atala et al. | 424/548 |
| 5,520,923 A | 5/1996 | Tjia et al. | 424/426 |
| 5,593,683 A | 1/1997 | Viegas et al. | 424/427 |
| 5,648,557 A | 7/1997 | Wei | 568/617 |
| 5,702,695 A | 12/1997 | Clokie | 424/78.08 |
| 5,707,962 A | 1/1998 | Chen et al. | 514/12 |
| 5,733,868 A | 3/1998 | Peterson et al. | 514/2 |
| 5,766,704 A | 6/1998 | Allen et al. | 428/34.1 |
| 5,837,235 A | 11/1998 | Mueller et al. | 424/93.7 |
| 5,854,382 A | 12/1998 | Loomis | 528/354 |
| 5,861,174 A | 1/1999 | Stratton et al. | 424/484 |
| 5,904,716 A | 5/1999 | Gendler | 424/423 |
| 5,910,315 A | 6/1999 | Stevenson et al. | 424/422 |
| 5,916,553 A | 6/1999 | Schmidt | 424/85.1 |
| 5,939,157 A | 8/1999 | Allen et al. | 428/35.7 |
| 5,952,077 A | 9/1999 | Booth et al. | 428/97 |
| 5,955,159 A | 9/1999 | Allen et al. | 428/34.1 |
| 5,968,556 A | 10/1999 | Atala et al. | 424/548 |
| 5,985,383 A | 11/1999 | Allen et al. | 428/34.1 |
| 6,005,020 A | 12/1999 | Loomis | 523/105 |
| 6,028,164 A | 2/2000 | Loomis | 528/354 |
| 6,030,635 A | 2/2000 | Gertzman et al. | 424/423 |
| 6,033,438 A | 3/2000 | Bianchi et al. | 623/17.16 |
| 6,133,211 A | 10/2000 | Cobianco et al. | 508/579 |
| 6,136,029 A | 10/2000 | Johnson et al. | 623/16.11 |
| 6,180,605 B1 | 1/2001 | Chen et al. | 514/12 |

(Continued)

FOREIGN PATENT DOCUMENTS

WO        WO 98/35631        8/1998

*Primary Examiner*—Michael P. Woodward
*Assistant Examiner*—Eric E. Silverman
(74) *Attorney, Agent, or Firm*—Banner & Witcoff, Ltd.

(57) ABSTRACT

End-capped polymers, methods for making those end-capped polymers, compositions containing those end-capped polymers, and methods for using those compositions are disclosed. One of the disclosed end-capped copolymers has the formula (I):

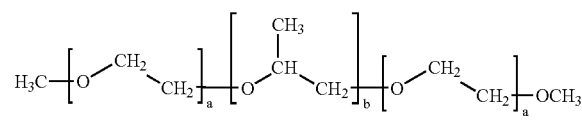

and may be combined with natural or synthetic bone minerals, bone tissue, collagen tissue, bone protein or combinations or derivatives of those materials to form a tissue repair composition.

48 Claims, No Drawings

U.S. PATENT DOCUMENTS

| | | |
|---|---|---|
| 6,180,606 B1 | 1/2001 | Chen et al. ............... 514/12 |
| 6,189,537 B1 | 2/2001 | Wolfinbarger, Jr. ......... 128/898 |
| 6,201,065 B1 | 3/2001 | Pathak et al. ............. 525/90 |
| 6,206,923 B1 | 3/2001 | Boyd et al. .............. 623/17.11 |
| 6,214,049 B1 | 4/2001 | Gayer et al. ............. 623/16.11 |
| 6,232,340 B1 * | 5/2001 | Zhang et al. .............. 514/492 |
| 6,281,195 B1 | 8/2001 | Rueger et al. .............. 514/21 |
| 6,305,379 B1 | 10/2001 | Wolfinbarger, Jr. ......... 128/898 |
| 6,309,659 B1 | 10/2001 | Clokie ................... 424/422 |
| 6,311,690 B1 | 11/2001 | Jefferies ................. 128/898 |
| 6,316,011 B1 | 11/2001 | Ron et al. ................ 424/401 |
| 6,316,522 B1 | 11/2001 | Loomis et al. ............. 523/105 |
| 6,403,758 B1 | 6/2002 | Loomis ................... 528/354 |
| 6,409,765 B1 | 6/2002 | Bianchi et al. ........... 623/17.11 |
| 6,410,645 B1 | 6/2002 | Pathak et al. ............. 424/78.2 |
| 6,425,920 B1 | 7/2002 | Hamada .................. 623/17.16 |
| 6,426,332 B1 | 7/2002 | Rueger et al. .............. 514/21 |
| 6,437,018 B1 | 8/2002 | Gertzman et al. ........... 523/116 |
| 6,623,729 B2 * | 9/2003 | Park et al. ............... 424/78.17 |
| 2001/0008317 A1 | 7/2001 | Gaylo et al. ................ 264/86 |
| 2001/0020188 A1 | 9/2001 | Sander .................... 623/23.57 |
| 2001/0038848 A1 | 11/2001 | Donda et al. .............. 424/423 |
| 2001/0043940 A1 | 11/2001 | Boyce et al. .............. 424/423 |
| 2002/0022883 A1 | 2/2002 | Burg ....................... 623/8 |
| 2002/0034531 A1 | 3/2002 | Clokie .................... 424/422 |
| 2002/0106393 A1 | 8/2002 | Bianchi et al. ............ 424/423 |
| 2002/0107570 A1 | 8/2002 | Sybert et al. ............. 623/13.17 |
| 2002/0120335 A1 | 8/2002 | Angelucci et al. ......... 623/17.16 |
| 2002/0160032 A1 | 10/2002 | Long et al. ............... 424/423 |
| 2002/0161443 A1 | 10/2002 | Michelson ................ 623/17.11 |

* cited by examiner

END-CAPPED POLYMERS AND COMPOSITIONS CONTAINING SUCH COMPOUNDS

This application is a continuation-in-part of U.S. patent application Ser. No. 10/326,339, filed on Dec. 20, 2002, which claims priority under 35 U.S.C. § 119 to U.S. Provisional Patent Application Ser. No. 60/345,113, filed Dec. 21, 2001. Both applications are incorporated herein by reference.

This invention relates to end-capped polymers, methods for making end-capped polymers, compositions containing such compounds, and methods for using such compositions. In particular, the end-capped polymers may be components of carriers for active ingredients. For example, carriers comprising an end-capped polymer according to the invention may be combined with biologically active ingredients, including natural or synthetic bone products or other osteogenic agents. The inventive compositions may be used for the treatment or repair of tissues, including bone defects.

BACKGROUND OF THE INVENTION

When active ingredients are therapeutically administered to a patient, they are often contained in a carrier. In the context of tissue repair, demineralized bone powder is often used as the active ingredient to induce new bone growth at a bone defect site. Demineralized bone powder can be a loose, powdery material that is not easily contained at a bone defect site, particularly in the presence of body fluids and surgical irrigation. Therefore, demineralized bone powder may be combined with a carrier in order to provide a composition with improved handling characteristics and the ability to stay in place at the bone defect site for a sufficient amount of time to effect new bone growth.

Demineralized bone powder is a material that can be prepared by conventional procedures. Demineralized bone powder is generally composed of particles of bone tissue that have been specially treated, generally by soaking in acid, to remove their mineral content. The resulting demineralized bone powder is composed mainly of highly cross-linked collagen. The remaining non-collagenous proteins include proteins such as TGF-β, PDGF, osteopontin, osteonectin, bone morphogenetic proteins (BMPs), and others. BMPs are a group of proteins categorized in the transforming growth factor beta super-family of proteins.

Isolated BMPs are another material that can induce the formation of new bone and that can be prepared by conventional procedures. To date, several BMPs have been isolated and associated with the bone healing process. BMPs can be isolated from bone as a mixture of proteins or produced individually through recombinant gene technology.

Demineralized bone powder and BMPs have been combined with carriers to produce bone repair compositions. Jefferies (U.S. Pat. No. 4,394,370) discloses tissue repair compositions containing demineralized bone powder, BMPs, or both in a reconstituted collagen matrix. Glowacki et al. (U.S. Pat. No. 4,440,750) discloses aqueous compositions of demineralized bone particles and reconstituted collagen fibers.

Clokie (U.S. Pat. No. 6,309,659) describes a biocompatible connective tissue repair composition comprising bone powder and a carrier of poloxamer 407 (also known as Pluronic® F127, manufactured by BASF Corporation) and water. Pluronic® F127 is a polyoxyethylene-polyoxypropylene-polyoxyethylene triblock copolymer:

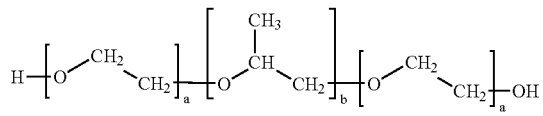

wherein a is about 101 and b is about 56. This molecule has two hydroxyl groups (—OH), one at each of the far ends of the long polymeric molecule. At particular concentrations and temperatures, a composition of Pluronic® F127 and water exhibits reverse phase thermal characteristics (also referred to as reverse phase behavior) in that it can form a gel and become increasingly viscous or solidified as its temperature increases.

Shimura et al. (International Patent Application No. WO97/18829) describes a composition that contains a polyoxyethylene-polyoxypropylene glycol (e.g., ADEKA® F127) and a bone morphogenetic protein, and reportedly displays a reverse phase characteristic.

There is a continuing need in the art for carriers for active ingredients and, in particular, for carriers to be used in tissue repair compositions.

SUMMARY OF THE INVENTION

This invention relates to end-capped polymers and compositions containing such compounds. The invention further relates to methods of making such end-capped polymers and methods of using compositions containing the end-capped polymers. In a preferred embodiment, a polymer containing a hydroxyl group (—OH) at one or both ends is treated to remove and replace the hydrogen portion of the hydroxyl end group(s) with a different functional group. Preferably, the hydrogen of the hydroxyl group is replaced with a less reactive functional group and, thereby, the polymer can be used as a carrier that is less reactive.

The end-capped polymers according to the invention can be used as carriers for active ingredients, particularly biologically active ingredients. The carrier may be formed by dispersing the end-capped polymer in a suitable solvent and under suitable conditions. The carrier preferably exhibits reverse phase behavior when its temperature is increased from room temperature to body temperature. In a preferred embodiment, the end-capped polymer is used within a carrier component of a tissue repair composition. More preferably, the tissue repair compositions according to the invention comprise a carrier comprising an end-capped polymer and one or more osteogenic agents, including natural or synthetic bone minerals, bone tissue, collagen tissue, proteins, including bone proteins, or combinations or derivatives of those materials. Such tissue repair compositions may be applied to a bone defect site, cartilage defect site, or other musculoskeletal sites. The composition can be applied by syringe, spatula, or other surgical delivery means. The inventive compositions can also be used as a coating, on surgical implants to be inserted at, or near bone defect sites, cartilage defect sites, or other musculoskeletal sites.

DESCRIPTION OF ILLUSTRATIVE EMBODIMENTS

The invention relates to end-capped polymers and compositions containing such compounds. The invention also relates to methods of preparing those end-capped polymers and the methods of using compositions containing the end-capped polymers.

Polymers are long molecules that may be in the form of homopolymers (containing a single type of monomer unit) or copolymers (containing two or more types of monomer units). Many polymers have hydroxyl (—OH) end groups. The compounds according to the invention are polymers that have one or more such hydroxyl groups removed or replaced.

For examples, polymers such as polyalkylene glycols, certain polyorthoesters, and copolymers containing polyoxyalkylene and/or polyorthoester units have one or more hydroxyl end groups. As a specific example, polyoxyethylene-polyoxypropylene-polyoxyethylene (POE-POP-POE) triblock copolymers sold under the tradename Pluronic® by BASF, have the following general structure:

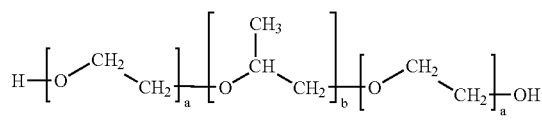

An end-capped polymer according to the invention would have one or both of the hydrogens of the hydroxyl groups removed and replaced with a different functional group. Preferably, the replacement functional group is a functional group that is less reactive than a hydroxyl group. More preferably the replacement functional group is a hydrocarbon group, such as a methyl group (—$CH_3$). For example, the end-capped polymer according to the invention may have a structure according to the following formula (I):

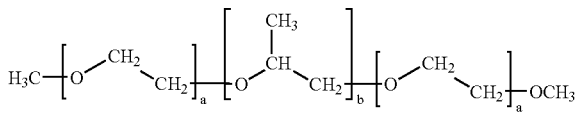

wherein a and b can be any integer(s) such that the resulting compound is capable of acting as a carrier for an active ingredient when combined with a suitable solvent under suitable conditions. In a further preferred embodiment, a and b are any integer(s) such that the compound exhibits reverse phase behavior when combined with a suitable solvent under suitable conditions. Reverse phase behavior is a characteristic exhibited when a composition becomes more fluid as its temperature rises. In the context of this invention, it is preferred that reverse phase behavior is exhibited by the carrier becoming more fluid as its temperature rises from ambient temperature to an elevated temperature. In a further preferred embodiment, the elevated temperature is body temperature. In a preferred embodiment, a is about 101 and b is about 56.

Alternatively, the hydroxyl end groups could be replaced with other carbon-containing functional groups or a halogen group such as a fluoride, bromide or iodide group.

In one embodiment, the end-capped polymer is in the form of a solid at room temperature. The end-capped polymer is dispersed in a solvent in order to form a carrier. In a preferred embodiment, the solvent is water. The carrier comprising the end-capped polymer preferably exhibits reverse phase behavior when its temperature rises from room temperature to body temperature. Preferably, the carrier is also biocompatible.

In a preferred embodiment, the invention is directed to a composition comprising (i) a soluble product extracted from demineralized bone and (ii) a carrier comprising a compound of the formula (I):

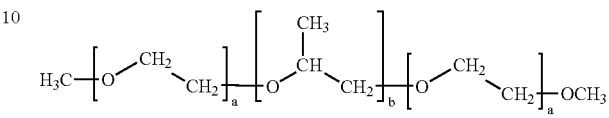

The carrier may further comprise a solvent, which is preferably water. As an example, the carrier may comprise about 25% to about 30% weight of the compound according to formula (I) and about 75% to about 70% weight water. In a preferred embodiment, the compound of formula (I) is defined such that a is about 101 and b is about 56.

In a preferred embodiment, the soluble product is about 20% to about 80% weight of the composition and the carrier is about 80% to 20% weight of the composition. In a further preferred embodiment, the soluble product is about 60% weight of the composition and the carrier is about 40% weight of the composition.

The composition may further comprise an insoluble product from a demineralized bone extraction process. In a further preferred embodiment, the soluble product is about 1% to about 80% weight of the composition, the carrier is about 10% to about 40% weight of the composition, and the insoluble product is about 20% to about 50% weight of the composition. More preferably, the soluble product is about 30% to about 40% weight of the composition, the carrier is about 26% to about 28% weight of the composition, and the insoluble product is about 30% weight of the composition.

The inventive compositions may further comprise demineralized bone, which can be in any form, including powder or chips. For example, in a preferred embodiment, the soluble product is about 1% to about 20% weight of the composition, the carrier is about, 10% to about 40% weight of the composition, the insoluble product is about 0.1% to about 15% weight of the composition, and the demineralized bone powder is about 10% to about 40% weight of the composition. In a further preferred embodiment, the soluble product is about 3% to about 5% weight of the composition, the carrier is about 26% to about 28% weight of the composition, the insoluble product is about 6% to about 9% weight of the composition, and the demineralized bone powder is about 23% to about 27% weight of the composition.

Bone chips may be added to any of the inventive compositions. In a preferred embodiment, bone chips are about 1% to about 20% weight of the composition.

The compositions according to the invention can also contain one or more of hydroxylapatite (also referred to as hydroxyapatite), tricalcium phosphate, biphasic calcium phosphate or calcium sulfate. In a preferred embodiment, the at least one of hydroxylapatite, tricalcium phosphate, biphasic calcium phosphate or calcium sulfate is about 15% to about 30% weight of the composition.

In an alternative embodiment, the invention is directed to a composition comprising (i) at least one of the materials demineralized bone powder, bone chips, insoluble product, hydroxylapatite, tricalcium phosphate, biphasic calcium phosphate, or calcium sulfate, wherein the material(s) have been coated with a soluble product extracted from demineralized bone and (ii) a carrier comprising a compound of the formula (I):

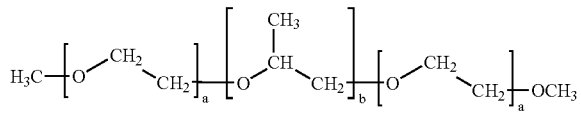

As defined above, the carrier may further comprise a solvent, such as water, and preferably exhibits reverse phase behavior.

In a preferred embodiment, the at least one coated material of demineralized bone powder, bone chips, insoluble product, hydroxylapatite, tricalcium phosphate, biphasic calcium phosphate, or calcium sulfate is about 30% to about 70% weight of the composition, the soluble product is about 5% to about 20% weight of the composition and the carrier is about 10% to about 40% weight of the composition.

In a further preferred embodiment, the composition comprises hydroxylapatite, and that hydroxylapatite may be treated with a poreformer and/or a binder. The hydroxylapatite may be derived from natural bone. In another preferred embodiment, the composition comprises a combination of hydroxylapatite and tricalcium phosphate. In that case, it is preferred that the hydroxylapatite is about 60% to about 80% weight of the combination and the tricalcium phosphate is about 20% to about 40% of the combination.

The particle size of the various components of the inventive compositions may vary. In a preferred embodiment, the particle size of the demineralized bone powder and the insoluble product is between about 10 to about 1,000 microns. In a further preferred embodiment, the particle size of the demineralized bone powder and the insoluble product is between about 125 to about 500 microns. The particle size of the bone chips, hydroxylapatite, tricalcium phosphate, biphasic calcium phosphate, and calcium sulfate is preferably between about 100 to about 7,000 microns. More preferably, the particle size of the bone chips, hydroxylapatite, tricalcium phosphate, biphasic calcium phosphate, and calcium sulfate is between about 1,000 to about 4,000 microns.

The compositions according to the invention are preferably tissue repair compositions that may be used in a method of treating tissue comprising applying the inventive composition to a tissue of a human or animal patient. In a preferred embodiment, the tissue is a bone defect site.

In a further preferred embodiment, the invention is directed to a composition comprising (i) an osteogenic agent and (ii) a carrier comprising a compound of the formula (I):

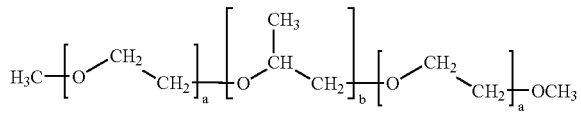

As defined above, the carrier may further comprise a solvent, such as water, and preferably exhibits reverse phase behavior.

The osteogenic agent is any agent that promotes, induces, stimulates, generates, or otherwise effects the production of bone or the repair of bone. The presence of an osteogenic agent in the defect site may elicit an effect on the repair of the defect in terms of shortening the time required to repair the bone, by improving the overall quality of the repair, where such a repair is improved over situations in which such osteogenic agents are omitted, or may achieve contemporaneously both shortened repair times and improved bone quality. In a preferred embodiment, the osteogenic agent is a protein, and more preferably a protein that enhances the repair of a bone defect. The term "protein" includes naturally occurring proteins, protein fragments, genetically or chemically modified proteins (including proteins with one or more additions, deletions, or substitutions of amino acids) and synthetic or recombinantly produced proteins. For example, the protein may be a bone morphogenic protein (BMP). Alternatively, the osteogenic agent may be a cell or population of cells, a synthetic molecule, drug or pharmaceutical involved in or important to bone or cartilage biology.

The demineralized bone used in the compositions according to the invention can be prepared according to a variety of different methods. Some conventional methods are identified in Jefferies, supra, and Glowacki et al., supra. Such conventional methods for preparing demineralized bone include a defatting step and a demineralization step. Different methods of defatting, e.g., hot water, or chloroform/methanol washes, can be used. Demineralization can be performed according to a variety of different methods, generally using different types of acid solutions for varying times and at variable temperatures. The demineralized bone can be prepared in a variety of shapes and sizes. In a preferred embodiment, the demineralized bone is in the form of a powder and, more preferably, has a size in the range of about 100 to about 850 μm.

In several of the above-mentioned embodiments of the present invention, the tissue repair composition comprises bone tissue extracted from demineralized bone. In a preferred embodiment, that bone tissue is recovered from the extraction of demineralized bone with a liquid solvent, wherein the demineralized bone is in the form of a powder. The extraction process is generally conducted at room temperature in a suitable extraction medium under suitable conditions.

For purposes of this patent application, the term "soluble product" or "soluble product from a demineralized bone extraction process" is defined as the bone tissue that is recovered from the solvent used to extract demineralized bone. An example of a soluble product is described in Example 5 of this specification.

For purposes of this patent application, the term "insoluble product" or "insoluble product from the demineralized bone extraction process" is defined as the insoluble product that remains after demineralized bone is extracted with a solvent. An example of an insoluble product is described in Example 5 of this specification.

These soluble and insoluble products may be further processed, for example, by centrifuging, decanting, filtering, titration, precipitation, dialyzing, fully or partially drying, rehydrating and/or sterilizing. In a preferred embodiment, these steps are performed without heating. For a detailed description of an extraction process, see co-pending U.S. application Ser. No. 10/195,671 entitled "Tissue Repair Compositions And Methods For Their Manufacture And Use," filed on Jul. 15, 2002, and PCT Application Ser. No. PCT/US/27908 (WO 03/020117) entitled "Tissue Repair Compositions And Methods For Their Manufacture And Use," filed on Aug. 30, 2002, which are incorporated herein by reference.

Additional materials may be added to the tissue repair composition according to the invention, including both active and nonactive ingredients. These additional materials include collagen, gelatin, residual solids produced during the extraction process that may or may not contain residual BMPs, bone mineral including, without limitation, cortical and/or cancellous bone (in any form including particles or chips), demineralized bone (in any form including particles or chips), partially demineralized bone (in any form including particles or chips), hydroxylapatite, tricalcium phosphate, biphasic calcium phosphate, calcium sulfate, biological, glasses, and natural or synthetic polymers.

In a preferred embodiment, the end-capped polymer can be used in a tissue repair composition that contains one or more of the soluble and/or insoluble products extracted from demineralized bone, as discussed above. For example, a carrier comprising the end-capped polymer combined with the soluble and/or insoluble product can be further combined with hydroxyapatite, tricalcium phosphate, biphasic calcium phosphate, calcium sulfate, BMPs, bone mineral including, without limitation, cortical and/or cancellous bone chips, partially demineralized bone, etc., biological glasses, and natural or synthetic polymers.

The biological, physicochemical and biodegradation properties of the tissue repair composition may be altered by known cross-linking agents such as chemicals (e.g., glutaraldehyde or formaldehyde) or radiation (e.g,. gamma or electron beam). Preferably radiation is used as the cross-linking agent, and most preferably electron beam (E-beam) radiation is used to irradiate the wet or dry materials.

In another preferred embodiment, the tissue repair composition has the consistency of a gel or putty.

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

A sample of Pluronic® F127 (BASF) is provided. The Pluronic® F127 molecules are transformed into their dilithium salts by dispersing the Pluronic® F-127 in an aprotic solvent such as tetrahydrofuran or an alkane with appropriate amounts of either n-butyllithium, commercially available in hexane solution, or lithium aluminum hydride, commercially available in solutions of THF.

Exposure of the Pluronic® F127 to butyllithium or to lithium aluminum hydride will lead to the evolution of an amount of either butane gas or hydrogen gas in proportion to the number of hydroxyl groups present in the Pluronic® F-127 molecule. From the average molecular weight of Pluronic® F-127 of 12,150, one can calculate that the proportion of hydroxyl groups present will cause a 1.25 gram-sample of Pluronic® F-127 to evolve 4.48 mL of gas at S.T.P. In order to generate a more accurately and readily measured volume of gas it is calculated that a 12.5 gram-sample of Pluronic® F-127 will lead to the evolution of 44.8 mL of gas at S.T.P. Thus, such gasometric measurements on the starting Pluronic® F-127 sample and such measurements conducted after the Pluronic® F-127 sample has been chemically modified will indicate the proportion of hydroxy groups initially present and will confirm that no hydroxyl groups are present in the chemically modified sample.

Once the Pluronic® F-127 sample is quantitatively transformed into its dilithium salt, an appropriate proportion of alkylating agent, namely methyl iodide will be added to complete the synthesis of the dimethyl ether derivative of Pluronic® F-127.

In order to ensure complete replacement of all lithiums by methyl groups the methyl iodide will be used in generous excess; since methyl iodide is quite volatile such excess methyl iodide will not be deleterious since it can be readily removed by evaporation of the reaction mixture. A small amount (e.g., about <0.05%) of 2,6-di-tert-butyl-4-methylphenol dissolved in a suitable solvent (e.g., anhydrous toluene) can optionally be added to ensure that the only chemical structural change of Pluronic® F-127 that has taken place is the desired replacement of one or both of the hydrogens of the hydroxyl groups with the methyl groups. The resulting solution of dimethyl capped polymer molecules will be subjected to evaporation under reduced. pressure in order to remove any traces of remaining methyl iodide or solvent. The end-capped polymer product may be recrystallize one or more times from a suitable solvent and thus the derivative can be purified by such selective crystallization from any small amounts of remaining impurities. As mentioned above, the final test for the complete absence of hydroxyl groups will be to expose purified product samples to lithium aluminum hydride solutions with the expectation that no hydrogen gas whatsoever should be evolved since there are no remaining hydroxyl groups. As a physical confirmation of the absence of such terminal hydroxyl groups, the purified derivative can be subjected in highly concentrated solutions to both infrared and proton NMR spectroscopic analyses.

Example 2

A carrier for a tissue repair composition is prepared by combining about 25% to about 30% weight of the end-capped polymer made according to Example 1 with about 75% to about 70% weight water. For example, the carrier can comprise about 26% weight end-capped polymer and about 74% weight water. Alternatively, the carrier can comprise about 30% weight end-capped polymer and about 70% weight water. The mixture may need to be stirred for several hours at a cooled temperature in order to completely disperse the end-capped polymer. For example, the end-capped polymer may be added to the water and stirred with a magnetic stir bar and/or shaker at low speed for at least about 24 hours at about 1 to about 10° C.

The carrier comprising the end-capped polymer and water is then combined with an amount of demineralized bone powder to obtain a desired consistency. For example, the composition may contain at least about 20 to about 30% weight demineralized bone powder by weight of the overall composition. The composition may be provided in a sterile, single use package.

Example 3

Additional components may be added to the composition described in Example 2. Such components may include bone morphogenetic protein(s), collagen, gelatin, residual solids produced during the extraction process that may or may not contain residual BMPs, bone mineral, hydroxyapatite, tricalcium phosphate, biphasic calcium phosphate, calcium sulfate, biological glasses, and natural or synthetic polymers.

Example 4

Instead of the bone powder as described in Examples 2, one or more extracted and purified or recombinantly produced BMP's may be added to the carrier described in Example 2.

Example 5

A tissue repair composition, is prepared by combining the carrier described in Example 2 with demineralized bone powder, the soluble product extracted from demineralized bone powder and the insoluble product extracted from demineralized bone powder. A detailed description of the extraction process for producing a soluble product and an insoluble product is provided in co-pending U.S. application Ser. No. 10/195,671 and PCT Application Serial No. PCT/US/27908 (WO 03/020117), which are incorporated herein by reference.

Preparation of Soluble and Insoluble Products

Demineralized bone powder is placed in a flask and 3M citric acid solution is added with agitation. The amount of 3M citric acid solution (e.g., prepared via the addition of citric acid monohydrate granules and sterile water) needed for agitation is calculated as follows: gram weight DBM× 20=mL 3M citric acid solution required. The agitation is continued for some period of time (e.g., about 72 hours) to ensure completion of the extraction. After the agitation, the solution is filtered, preferably with deionized water, resulting in a soluble product and an insoluble product. Dialysis of the soluble product is performed, preferably using deionized water. The pH of the soluble product after dialysis is preferably about 4.5 to about 5. After dialysis, the soluble product can be lyophilized. However, it is preferred that the soluble product is first placed in a freezer (preferably at about $-80°$ C.) for about 12 hours or more before lyophilization. The lyophilized soluble product may have a cotton-like in appearance and texture. The insoluble product is subject to buffer wash(es), preferably using an about 0.1 M sodium phosphate buffer solution. Upon completion of the buffer wash(es), it is preferred that the surface pH of the insoluble product is about 4 to about 5. After the buffer wash(es), the insoluble product can be lyophilized. However, it is preferred that the insoluble product is first placed in a freezer (preferably at about $-80°$ C.) for about 12 hours or more before lyophilization. The lyophilized soluble product may have a similar appearance and texture to demineralized bone powder. Following lyophilization, it is preferred that the soluble product and the insoluble production are e-beam sterilized (e.g., at about 10.1 kGy).

Preparation of an End-capped Polymer

A reactor was purged with $N_2$, and then charged with 7–10 gallons of anhydrous toluene. The temperature controller of the reactor was then set to 45° C. 7.3 kg of Pluronic® F-127 was then added to the reactor, under an Argon environment, and the Pluronic® F-127 was dried with nitrogen until its water content was below 150 ppm. The Pluronic® F127 dispersion was then sparged with dry argon to displace the absorbed nitrogen.

The reactor was then cooled to 0° C. At 3° C., the stirring speed was increased and the reactor was charged with 350 mL of 10M butyl lithium in hexane. Within 45 minutes, the mixture turned dark orange and the temperature was then increased to 45° C. At this point, the mixture was stirred for 5–6 hours at 45° C.

The temperature of the reactor was then decreased, and the mixture stirred in the cooled reactor at 0–5° C. for 1 hour. The temperature was then raised to 8–15° C. and the mixture was stirred in the reactor for another 2 hours.

1.5 kg (~750 mL) of freshly distilled methyl iodide was then added to the reactor, and stirring was continued overnight at ambient temperature with the reactor pressurized to 2 psi with dry argon. A vacuum was then applied for 4 hours.

Then, 1.6 g of BHT dissolved in 5 mL of anhydrous toluene was added to the reactor and the mixture was stirred for 10 minutes. The temperature of the reactor was then increased to 50° C.±5° C. At 50° C., the heat was turned off and the mixture was allowed to settle overnight. After reaction, the gel-salts layer will separate inside the reactor.

The mixture is then centrifuged, and hexane was then added to the reactor in a 2:1 ratio to precipitate polymer. That mixture was then stirred for 5–10 minutes. This mixture was then allowed to stand for 30±5 minutes. The hexane was then removed.

The precipitated polymer was then filtered and washed again with hexane. The polymer was then dried in flowing air at ambient temperature before transferring to a convection oven with temperature of 40±10° C. The polymer was then monitored until volatile content reached below 1.5% and toluene below 0.01%.

Preparation of a Carrier Containing the End-capped Polymer

The end-capped polymer described above may be used to prepare a carrier according to the steps described in Example 2. The pH of the polymer/water dispersion during mixing is preferably in the range of 6.3 to 6.9, and the prepared carrier has a cohesive, non-sticky putty-like consistency. Preferably, the carrier exhibits reverse phase behavior when its temperature rises from ambient to body temperature.

Preparation of a Tissue Repair Composition

The lyophilized soluble product is combined with sterile water and mixed until the soluble product is dissolved. The pH of this mixture is preferably about 4. This mixture is optionally titrated with 2M LBX (citric acid solution), preferably until the pH of the mixture reaches about 1.6–1.9. Demineralized bone powder and the insoluble product of desired particle size (e.g., about 125 to about 500 microns) are added to the mixture and combined, preferably until an even, dry, putty-like consistency is attained. The desired particle size of the insoluble product can be obtained by any conventional methods (e.g., sieving).

The particle size and the percentage by weight of each component of the resulting tissue repair composition can vary based upon the desired application. In this example, the particle size of demineralized bone powder and insoluble product is about 10 to about 1000 microns (preferably about 125 to about 500 microns) and the tissue repair composition comprises about 10% to about 40% (preferably about 20% to about 30% and more preferably about 26% to about 28%) weight of the end-capped polymer made according to Example 1, about 10% to about 40% (preferably about 20% to about 30% and more preferably about 23% to about 27%) weight of demineralized bone powder, about 1% to about 20% (preferably about 2% to about 10% and more preferably about 3% to about 5%) weight of the soluble product and about 0.1% to about 15% (preferably about 1% to about 10% and more preferably about 6% to about 9%) weight of the insoluble product.

The resulting tissue repair composition can optionally be subject to additional processes (e.g., e-beam sterilization, packaging, etc.).

Example 6

This Example is directed to a tissue repair composition as described in Example 5, except that demineralized bone powder is not added. The percent weight of each component of this tissue repair composition can vary based upon the desired application. In this Example, the tissue repair composition comprises about 10% to about 40% (preferably about 20% to about 30% and more preferably about 26% to about 28%) weight of the end-capped polymer made according to Example 1, about 1% to about 80% (preferably about 50% to about 70% and more preferably about 30% to about 40%) weight of the soluble product and about 20% to about 50% (preferably about 25% to about 35% and more preferably about 30%) weight of the insoluble product.

Example 7

This Example is directed to a tissue repair composition as described in Example 6, except that the insoluble product is not added. The percent weight of each component of this tissue repair composition can vary based upon the desired application. In this example, the tissue repair composition comprises about 20% to about 80% (preferably about 30% to about 50% and more preferably about 40%) weight of the end-capped polymer made according to Example 1, and about 20% to 80% (preferably about 30% to about 70% and more preferably about 60%) weight of the soluble product.

Example 8

Bone chips, preferably cancellous bone chips, are added to the tissue repair composition described in Example 5. The particle size and the percent weight of each component of the tissue repair composition can vary based upon the desired application. In this example, the particle size of the bone chips is about 100 to about 7,000 microns (preferably about 1000 to about 4,000 microns for orthopedic applications and about 100 to about 2,000 microns for oral/maxillary applications) and the bone chips are about 1% to about 20% (preferably about 5% to about 15% and more preferably about 10%) weight of the tissue repair composition.

Example 9

Bone chips, preferably cancellous bone chips, are added to the tissue repair, composition described in Example 6. The particle size and the percentage of each component of the tissue repair compositions can vary based upon the desired application. In this example, the particle size of the bone chips is about 100 to about 7,000 microns (preferably about 1000 to about 4,000 microns for orthopedic applications and about 100 to about 2,000 microns for oral/maxillary applications) and the bone chips are about 1% to about 20% (preferably about 5% to about 15% and more preferably about 10%) weight of each of the tissue repair compositions.

Example 10

Bone chips, preferably cancellous bone chips, are added to the tissue repair composition described in Example 7. The particle size and the percent weight of each component of the tissue repair compositions can vary based upon the desired application. In this example, the particle size of the bone chips is about 100 to about 7,000 microns (preferably about 1000 to about 4,000 microns for orthopedic applications and about 100 to about 2,000 microns for oral/maxillary applications) and the bone chips are about 5% to about 25% (preferably about 10% to about 15% and more preferably about 15%) weight of each of the tissue repair compositions.

Example 11

At least one of the following compounds is added to each of the tissue repair compositions described in Examples 5, 6 and 7: hydroxylapatite, tricalcium phosphate, biphasic calcium phosphate and calcium sulfate ("Compound(s)"). The particle size and the percent weight of each component of these tissue repair compositions can vary based upon the desired application. In this example, the particle size of the Compound(s) is about 100 to about 7,000 microns (preferably about 1000 to about 4,000 microns for orthopedic applications and about 100 to about 2,000 microns for oral/maxillary applications) and the total weight of the Compound(s) is about 15% to about 30% (preferably about 20% to about 25%) weight of the tissue repair composition.

Example 12

At least one of the following compounds is added to each of the tissue repair compositions described in Examples 8, 9 and 10: hydroxylapatite, tricalcium, phosphate, biphasic calcium phosphate and calcium sulfate ("Compounds(s)"). The particle size and the percent weight of each components of these tissue repair compositions can vary based upon the desired application. In this example, the particle size of the Compound(s) is about 100 to about 7,000 microns (preferably about 1000 to about 4,000 microns for orthopedic applications and about 100 to about 2,000 microns for oral/maxillary applications) and the total weight of the compound(s) is about 5% to about 15% (preferably about 10%) weight of the tissue repair composition.

Example 13

A tissue repair composition is prepared by coating at least one of the following materials with the soluble product described in Example 5 and then combining it with the carrier comprising the end-capped polymer made according to Example 2: DBM, bone chips, insoluble product, hydroxylapatite, tricalcium phosphate, biphasic calcium phosphates, and calcium sulfate. The coating process begins with combining the lyophilized soluble product with sterile water and mixing until the soluble product is dissolved. The pH of this mixture is preferably about 4. This mixture is then used to coat at least one of the materials described above using art-disclosed methods. The resulting coated material(s) is then combined with a carrier:comprising the end-capped polymer made according to Example 2 using art-disclosed methods. The particle size and the percent weight of each component of the tissue repair composition can vary based upon the desired application. In this example, the particle size of the material(s) is about 100 to about 7,000 microns (preferably about 1000 to about 4,000 microns for orthopedic applications and about 100 to about 2,000 microns for oral/maxillary applications) and the tissue repair composition comprises about 10% to about 40% (preferably about 15% to about 30% and more preferably about 20% to about 25%) weight of the end-capped polymer made according to Example 1, about 5% to about 20% (preferably about 10% to about 15%) weight of the soluble product and about 30% to about 70% (preferably about 40% to about 60%, more preferably 50% to about 55%) weight of the material(s).

Example 14

This Example is directed to tissue repair compositions as described in Examples 11 and 12, wherein the added Compound(s) is hydroxylapatite. Preferably, the hydroxylapatite conforms to the ASTM Standard Specification for Composition of Anorganic Bone for Surgical Implants (Designation F 1581-99), which is incorporated herein by reference. The hydroxylapatite can be prepared using art-disclosed methods. For example, preparation of hydroxylapatite can begin by crushing bone particles, preferably with particle size in the range of about 250 to about 2800 microns and boiling them with deionized water to remove organic materials. This removal process may also include boiling the crushed bone particles in a solution of about 1% sodium hydroxide and deionized water and/or about 1% by weight hydrogen peroxide in deionized water. The boiled and crushed bone particles are then dried, sintered, preferably at between about 700 and about 975° C., and crushed again to desired particle size. The resulting hydroxylapatite particles are then visually inspected and cleaned (e.g,. sonication, deprotonation, etc.). X-ray diffraction, Fourier Transfer, infrared analysis, pH testing, and other art-disclosed analytical chemical techniques can optionally be used to confirm that these hydroxylapatite particles conform to the ASTM Standard Specification for Composition of Anorganic Bone for Surgical Implants (Designation F 1581-99). It is preferred that the pH of these hydroxylapatite particles is in the range of about 9 to about 11.5.

Example 15

This Example is directed to tissue repair compositions as described in Examples 11 and 12, wherein the added Compound(s) is hydroxylapatite. Preferably, the hydroxylapatite conforms to the ASTM Standard Specification for Composition of Ceramic Hydroxylapatite for Surgical Implants (Designation F 1185-88), which is incorporated herein by reference. The hydroxylapatite can be prepared using art-disclosed methods. For example, preparation of hydroxylapatite can begin by combining a solution comprising monobasic ammonium phosphate and deionized water with a solution comprising calcium oxide and deionized water, preferably in a slow stream fashion and then heated in an effort to ensure the chemical reaction is uniform and completed, resulting in a slurry. The slurry is then vacuum filtered, dried, and crushed to the desired particle size. The resulting hydroxylapatite particles are then combined with a suitable ceramic binder solution. In this Example, about 1 kg of hydroxylapatite particles is combined with a solution comprising about 100 g of stearic acid and about 2 L of acetone producing a slurry. The slurry is then filtered, dried, crushed to desired particle size, steamed autoclaved to avoid over-dryness, pressed using techniques and pressures common in ceramic technology to obtain a "green compact", slowly heated to burn out the excess binder, and then sintered. The binded hydroxylapatite particles can again be crushed if necessary to obtain desired particle size, visually inspected and cleaned (e.g., sonication, depyrogenation, etc.). X-ray diffraction, Fourier Transfer, infrared analysis, pH testing, and other art-disclosed analytical chemical techniques can optionally be used to confirm that these particles conform to the ASTM Standard Specification for Composition of Ceramic Hydroxylapatite for Surgical Implants. It is preferred that the pH of these particles is in the range of about 9 to about 11.5. The amounts of monobasic ammonium phosphate and calcium oxide can varied based upon the desired composition. In this example, about 690 grams of monobasic ammonium phosphate and about 560 grams of calcium oxide were used to produce about 1 kg of hydroxylapatite particles.

Example 16

This Example is directed to a tissue repair composition as described in Example 15, except that a suitable poreformer (e.g., polyethylene glycol, naphthalene, etc.) is combined with the bound hydroxylapatite particles, preferably in a ratio of about 2 to about 3 to form porous and bound hydroxylapatite particles. This combination step is preferably conducted after the steam autoclaving step and before the pressing step described in Example 15.

Example 17

This Example is directed to tissue repair compositions as described in Examples 11 and 12, wherein the added Compound(s) are a combination of hydroxylapatite and tricalcium phosphate. Preferably, the hydroxylapatite conforms with the ASTM Standard Specification for Composition of Ceramic Hydroxylapatite for Surgical Implants (Designation F 1185-88) and the tricalcium phosphate conforms with the ASTM Standard Specification for Beta-Tricalcium Phosphate for Surgical Implantation (Designation F 1088-87), which are incorporated herein by reference. Both hydroxylapatite and tricalcium phosphate can be obtained commercially or prepared using art-disclosed methods. For example, preparation of hydroxylapatite and tricalcium phosphate can begin by combining a solution comprising monobasic ammonium phosphate, deionized water and phosphoric acid (preferably about 85% weight) with a solution comprising calcium oxide and deionized water, preferably in a slow stream fashion and then heated in an effort to ensure the chemical reaction is uniform and completed, resulting in a slurry. The slurry is then vacuum filtered, dried, and crushed to desired particle size (e.g., about 100 to about 7000 microns, preferably about 1000 to about 4000 microns for orthopedic applications and about 100 to about 2000 for oral/maxillary applications). The resulting hydroxylapatite and tricalcium phosphate particles are then visually inspected and cleaned (e.g., sonication, depyrogenation, etc.). X-ray diffraction, Fourier Transfer, infrared analysis, pH testing, and other art-disclosed analytical chemical techniques can optionally be used, to confirm that these particles conform to the ASTM Standard Specifications (mentioned above) for hydroxylapatite and tricalcium phosphate. It is preferred that the pH of these: particles is in the range of about 9 to about 11.5. The amounts of monobasic ammonium phosphate, phosphoric acid and calcium oxide can varied based upon the desired composition. In this example, about 200 grams of monobasic ammonium phosphate and about 550 grams of calcium oxide were used to produce about 1 kg of particles that are about 40% weight hydroxylapatite and about 60% weight tricalcium phosphate. It is preferred that the resulting particles are about 15% to about 85% weight tricalcium phosphate and 85% to about 15% weight hydroxylapatite and more preferably 60% to about 80% weight tricalcium phosphate and 40% to about 20% weight hydroxylapatite.

What is claimed is:

1. A composition comprising: (i) a soluble product extracted from demineralized bone and (ii) a carrier comprising a polyoxyethylene-polyoxypropylene-polyoxyethylene triblock copolymer wherein both terminal hydroxyl groups in the triblock copolymer have been replaced with terminal methoxy groups and wherein the polyoxyethylene-polyoxypropylene-polyoxyethylene triblock copolymer is derived from a dilithium salt of a dihydroxy starting material, and wherein the compound has no hydroxyl groups.

2. The composition according to claim 1, wherein the carrier further comprises a solvent.

3. The composition according to claim 2, wherein the solvent is water.

4. The composition according to claim 3, wherein the carrier comprises about 25% to about 30% weight of the compound according to formula (I) and about 75% to about 70% weight water.

5. The composition according to claim 1, wherein the degree of polymerization of the polyoxyproplylene block is about 101 and the degree of polymerization of both polyoxyethylene blocks is about 56" therefor.

6. The composition according to claim 4, wherein the carrier exhibits reverse phase behavior.

7. The composition according to claim 1, wherein the soluble product is about 20% to about 80% weight of the composition and the carrier is about 80% to 20% weight of the composition.

8. The composition according to claim 7, wherein the soluble product is about 60% weight of the composition and the carrier is about 40% weight of the composition.

9. The composition according to claim 1, further comprising an insoluble product extracted from demineralized bone.

10. The composition according to claim 9, wherein the soluble product is about 1% to about 80% weight of the composition, the carrier is about 10% to about 40% weight of the composition, and the insoluble product is about 20% to about 50% weight of the composition.

11. The composition according to claim 10, wherein the soluble product is about 30% to about 40% weight of the composition, the carrier is about 26% to about 28% weight of the composition, and the insoluble product is about 30% weight of the composition.

12. The composition according to claim 9, further comprising demineralized bone.

13. The composition according to claim 12, wherein the demineralized bone is in the form of a powder.

14. The composition according to claim 13, wherein the soluble product is about 1% to about 20% weight of the composition, the carrier is about 10% to about 40% weight of the composition, the insoluble product is about 0.1% to about 15% weight of the composition, and the demineralized bone powder is about 10% to about 40% weight of the composition.

15. The composition according to claim 14, wherein the soluble product is about 3% to about 5% weight of the composition, the carrier is about 26% to about 28% weight of the composition, the insoluble product is about 6% to about 9% weight of the composition, and the demineralized bone powder is about 23% to about 27% weight of the composition.

16. The composition according to claim 1, further comprising bone chips.

17. The composition according to claim 16, wherein the bone chips are about 1% to about 20% weight of the composition.

18. The composition according to claim 9, further comprising bone chips.

19. The composition according to claim 18, wherein the bone chips are about 1% to about 20% weight of the composition.

20. The composition of claim 9, further comprising at least one of hydroxylapatite, tricalcium phosphate, biphasic calcium phosphate or calcium sulfate.

21. The composition according to claim 12, further comprising at least one of hydroxylapatite, tricalcium phosphate, biphasic calcium phosphate or calcium sulfate.

22. The composition according to claim 21, wherein the at least one of hydroxylapatite, tricalcium phosphate, biphasic calcium phosphate or calcium sulfate is about 15% to about 30% weight of the composition.

23. The composition according to claim 16, further comprising at least one of hydroxylapatite, tricalcium phosphate, biphasic calcium phosphate or calcium sulfate.

24. The composition according to claim 18, further comprising at least one of hydroxylapatite, tricalcium phosphate, biphasic calcium phosphate or calcium sulfate.

25. A composition comprising (i) at least one material of demineralized bone powder, bone chips, insoluble product, hydroxylapatite, tricalcium phosphate, biphasic calcium phosphate, or calcium sulfate, wherein the material is coated by a soluble product extracted from demineralized bone and (ii) a carrier comprising a polyoxyethylene-polyoxypropylene-polyoxyethylene triblock copolymer wherein both terminal hydroxyl groups in the triblock copolymer have been replaced with terminal methoxy groups.

26. The composition according to claim 25, wherein the at least one coated material of demineralized bone powder, bone chips, insoluble product, hydroxylapatite, tricalcium phosphate, biphasic calcium phosphate, or calcium sulfate is about 30% to about 70% weight of the composition, the soluble product is about 5% to about 20% weight of the composition and the carrier is about 10% to about 40% weight of the composition.

27. The composition according to claim 25, wherein the composition comprises hydroxylapatite.

28. The composition according to claim 27, wherein the hydroxylapatite has been treated with a poreformer.

29. The composition according to claim 27, wherein the hydroxylapatite is derived from bone.

30. The composition according to claim 27, wherein the hydroxylapatite has been treated with a binder.

31. The composition according to claims 25, wherein the composition comprises a combination of hydroxylapatite and tricalcium phosphate.

32. The composition according to claim 31, wherein the hydroxylapatite is about 60% to about 80% weight of the combination and the tricalcium phosphate is about 20% to about 40% of the combination.

33. The composition according to claim 25, wherein the particle size of the demineralized bone powder and the insoluble product is between about 10 to about 1,000 microns.

34. The composition according to claim 33, wherein the particle size of the demineralized bone powder and the insoluble product is between about 125 to about 500 microns.

35. The composition according to claim 25, wherein the particle size of the bone chips, hydroxylapatite, tricalcium phosphate, biphasic calcium phosphate, and calcium sulfate is between about 100 to about 7,000 microns.

36. The composition according to claim 35, wherein the particle size of the bone chips, hydroxylapatite, tricalcium phosphate, biphasic calcium phosphate, and calcium sulfate is between about 1,000 to about 4,000 microns.

37. A method of treating tissue comprising applying a composition of claim 1 to a tissue.

38. The method of claim 37, wherein the tissue is a bone defect site.

39. A method of treating tissue comprising applying a composition of claim 25 to a tissue.

40. The method of claim 39, wherein the tissue is a bone defect site.

41. A composition comprising: (i) an osteogenic agent and (ii) a carrier comprising a polyoxyethylene-polyoxypropylene-polyoxyethylene triblock copolymer wherein both terminal hydroxyl groups in the triblock copolymer have been replaced with terminal methoxy groups and wherein the polyoxyethylene-polyoxypropylene-polyoxyethylene triblock copolymer is derived from a dilithium salt of a dihydroxy starting material, and wherein the compound has no hydroxyl groups.

42. The composition according to claim 41, wherein the carrier further comprises a solvent.

43. The composition according to claim 42, wherein the solvent is water.

44. The composition according to claim 43, wherein the carrier comprises about 25% to about 30% weight of the compound according to formula (I) and about 75% to about 70% weight water.

45. The composition according to claim 41, wherein a is about 101 and b is about 56.

46. The composition according to claim 43, wherein the carrier exhibits reverse phase behavior.

47. The composition of claim 41, wherein the osteogenic agent is a protein.

48. The composition of claim 47, wherein the osteogenic agent is a protein that enhances the repair of a bone defect.

* * * * *

UNITED STATES PATENT AND TRADEMARK OFFICE
CERTIFICATE OF CORRECTION

PATENT NO. : 7,205,337 B2 Page 1 of 1
APPLICATION NO. : 10/600130
DATED : April 17, 2007
INVENTOR(S) : John F. Kay and John J. Eisch It is certified that error appears in the above-identified patent and that said Letters Patent is hereby corrected as shown below:

Col. 15, lines 22-25;
In claim 5, kindly replace "the degree of polymerization of the polyoxyproplylene block is about 101 and the degree of polymerization of both polyoxyethylene blocks is about 56" therefore" with --the degree of polymerization of the polyoxypropylene block is about 56 and the degree of polymerization of both polyoxyethylene blocks is about 101--.

Col. 18, lines 12-13;
In claim 45, kindly replace "a is about 101 and b is about 56" with --the degree of polymerization of the polyoxypropylene block is about 56 and the degree of polymerization of both polyoxyethylene blocks is about 101--.

Signed and Sealed this

Fourth Day of March, 2008

JON W. DUDAS
*Director of the United States Patent and Trademark Office*